US008881997B2

(12) United States Patent
Yi et al.

(10) Patent No.: US 8,881,997 B2
(45) Date of Patent: Nov. 11, 2014

(54) NANOPARTICLE AEROSOL GENERATOR

(75) Inventors: Jinghai Yi, Morgantown, WV (US);
Timothy Robert Nurkiewicz, Morgantown, WV (US); Jinghai Yi, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 376 days.

(21) Appl. No.: 13/317,472

(22) Filed: Oct. 19, 2011

(65) Prior Publication Data

US 2012/0091223 A1 Apr. 19, 2012

Related U.S. Application Data

(60) Provisional application No. 61/455,355, filed on Oct. 19, 2010.

(51) Int. Cl.
*B05B 9/00* (2006.01)
*C01G 23/047* (2006.01)
*C01F 17/00* (2006.01)
*B01J 8/00* (2006.01)
*B01J 8/40* (2006.01)

(52) U.S. Cl.
CPC .......... *C01G 23/047* (2013.01); *C01F 17/0043* (2013.01); *B01J 8/0055* (2013.01); *C01P 2006/10* (2013.01); *B01J 8/40* (2013.01); *C01P 2004/52* (2013.01); *B01J 8/004* (2013.01); *B01J 2208/00902* (2013.01); *C01P 2004/64* (2013.01); *B01J 2208/0084* (2013.01); *B01J 2208/00681* (2013.01); *B01J 8/006* (2013.01); *Y10S 239/23* (2013.01)
USPC .......... 239/144; 239/338; 239/370; 239/575; 239/590; 239/DIG. 23; 128/203.12; 128/203.15; 406/173

(58) Field of Classification Search
CPC ...................................... B05B 17/04
USPC ........ 128/203.12, 203.15, 203.19; 210/146.3, 210/189.06, 499, 649, 650; 239/8, 102.1, 239/102.2, 144, 338, 370, 462, 575, 589.1, 239/590, DIG. 23; 406/173
See application file for complete search history.

(56) References Cited

U.S. PATENT DOCUMENTS

| | | | | |
|---|---|---|---|---|
| 3,278,165 A | * | 10/1966 | Gaffney | 366/119 |
| 3,295,838 A | * | 1/1967 | Ban | 366/114 |
| 3,733,060 A | * | 5/1973 | Merritt | 261/1 |
| 4,009,713 A | * | 3/1977 | Simmons et al. | 128/200.18 |
| 4,859,430 A | * | 8/1989 | Julian et al. | 422/310 |
| 5,609,798 A | * | 3/1997 | Liu et al. | 261/78.2 |

(Continued)

OTHER PUBLICATIONS

Gupta, Amit et al., Generation of C60 Nanoparticle Aerosol in High Mass Concentrations, May 1, 2007, Jornal of Aerosol Science, Aerosol Science 28 (2007) 592-603, p. 594.*

(Continued)

*Primary Examiner* — Dinh Q Nguyen
(74) *Attorney, Agent, or Firm* — Buchanan Ingersoll & Rooney PC; Craig G. Cochenour

(57) ABSTRACT

A nanoparticle aerosol generator, comprised of a vibrating fluidized bed with a baffle, a vibrating Venturi disperser and a cyclone separator. To generate nanoparticle aerosols, the nanoparticle aerosol generator uses the multiple impaction, vibrating air flow and vibrating high speed air flow to break up larger agglomerates, and multiple dilution to minimize the re-agglomeration of the particles.

16 Claims, 12 Drawing Sheets

(56) References Cited

U.S. PATENT DOCUMENTS

| | | | |
|---|---|---|---|
| 6,338,440 B1* | 1/2002 | Horner | 239/8 |
| 7,290,542 B1* | 11/2007 | Carpin et al. | 128/200.21 |
| 7,802,569 B2* | 9/2010 | Yeates et al. | 128/203.12 |
| 2004/0050952 A1* | 3/2004 | Chen et al. | 239/102.1 |
| 2007/0235558 A1* | 10/2007 | Ballu et al. | 239/143 |

OTHER PUBLICATIONS

Baron, Paul A. et al., Aerosol Measurement: Principles, Techniques, and Applications, 2001, Wiley-Interscience, Second Edition, p. 649.*

Spurny, Kvestoslav R., Advances in Aerosol Filtration, Mar. 1998, CRC Press Inc., p. 488.*

A. Gupta, et al., Generation of C60 Nanoparticle Aerosol in High Mass Concentrations, Aerosol Science 2007, 592-603, 38.

Schmoll, L.H. et al., Nanoparticle Aerosol Generation Methods from Bulk Powders for Inhalation Exposure Studies, Nanotoxicology, 2009, 265-275, vol. 3 (4), Informa UK Ltd.

Spurny, K.R. et al., A Note on the Dispersing of Fibrous Powders, Ann. Occup. Hyg., 1976, 85-87, vol. 19, Pergamon Press, Great Britain.

Eduard, W. et al., Generation and Homogeneity of Aerosols in a Human Whole-Body Inhalation Chamber, Ann. Occup. Hyg., 2008, 545-554, vol. 52, No. 6, Oxford University Press.

Cheng, Y.S. et al., A Venturi Disperser as a Dry Powder Generator for Inhalation Studies, Inhalation Toxicology, 1989, 365-371, vol. 1, No. 4.

Prenni, A. J. et al., Design and Characterization of a Fluidized Bed Aerosol Generator: A Source for Dry, Submicrometer Aerosol, Aerosol Science and Technology, 2000, 465-481, vol. 32 (5), Taylor and Francis.

Voss, A., et al., Deagglomeration of Dry Powder Pharmaceutical Aerosols, International Journal of Pharmaceutics, 2002, 39-50, vol. 248, Elsevier.

To, D. et al., Deagglomeration of Nanoparticle Aggregates via Rapid Expansion of Supercritical or High-Pressure Suspensions, AIChE Journal, 2009, 2807-2826, vol. 55, No. 11, American Institute of Chemical Engineers.

Willeke, K., Generation of Aerosols and Facilities for Exposure Experiments, Ann Arbor Science Publishers, 1980, 16-27.

Moon, S.J. et al., Particle Simulation of Vibrated Gas-Fluidized Beds of Cohesive Fine Powders, 2006, 6966-6977, VOl. 45, Ind. Eng. Chem. Res.

* cited by examiner

NANOPARTICLE AEROSOL GENERATOR

CROSS-REFERENCE TO RELATED APPLICATIONS

This application claims priority to U.S. provisional application No. 61/455,355 filed on Oct. 19, 2011.

STATEMENT REGARDING FEDERALLY SPONSORED RESEARCH OR DEVELOPMENT

This invention was made with government support under RC1 ES018274 and R01 ES015022 awarded by the National Institute of Health. The government has certain rights in the invention.

REFERENCE TO SEQUENCE LISTING, A TABLE, OR A COMPUTER PROGRAM LISTING COMPACT DISC APPENDIX

Not Applicable

DETAILED DESCRIPTION OF THE INVENTION

The study of the health effects of nano-sized aerosol particles requires the particles delivered to the laboratory animals in the exposure chamber to have: (1) a consistent concentration maintained at a desired level for hours, (2) a homogenous composition free from contaminants, and (3) a size distribution with a geometric mean diameter<200 nm and a geometric standard deviation $\sigma_g$<2.5 (Schmoll et al, 2009). Generation of nanoparticle aerosols at concentrations sufficient to perform toxicology studies is highly challenging because nanoparticles tend to agglomerate due to very strong inter-particle forces and form large fractal structures in tens or hundreds of microns in size (To et al, 2009), which are difficult to be broken up, especially for sticky or cohesive powders such as nano-$TiO_2$ dry powder.

In order to perform inhalation studies, the test aerosols can be created by aerosolizing a particle bulk powder. Some common aerosol generators used for this purpose include nebulizers, fluidized beds, Venturi aspirators, and the Wright dust feed (Willeke 1980). However, past test aerosol production typically focused on producing aerosols with a size distribution with median diameter greater than 1 μm (Schmoll et al, 2009). Recently, five different generation methods for producing a nanoparticle aerosol from the bulk powder were evaluated with the goal of producing an acceptable nanoparticle aerosol, however, none of the devices were able to satisfy all criteria for an acceptable aerosol (Schmoll et al, 2009). Existing aerosol generators can not create aerosols in the size range, concentration and duration which are necessary for nanoparticle inhalation toxicology studies. This is particularly true for inhalation exposure chambers such as with a volume of 0.5 m³ or more.

The embodied nanoparticle aerosol generator, consisting of a vibrating fluidized bed with a baffle and a vibrating Venturi disperser as well as a cyclone separator, utilizes vibrating high speed shear flow and multiple impaction to disperse larger agglomerates of nanoparticles. Additionally it can use multiple dilution to minimize re-agglomeration of the particles. The particle size and mass concentration produced by the nanoparticle aerosol generator can be controlled by adjusting flow rate of air through dry powder layer, and vibration frequency and amplitude.

Figure 1:
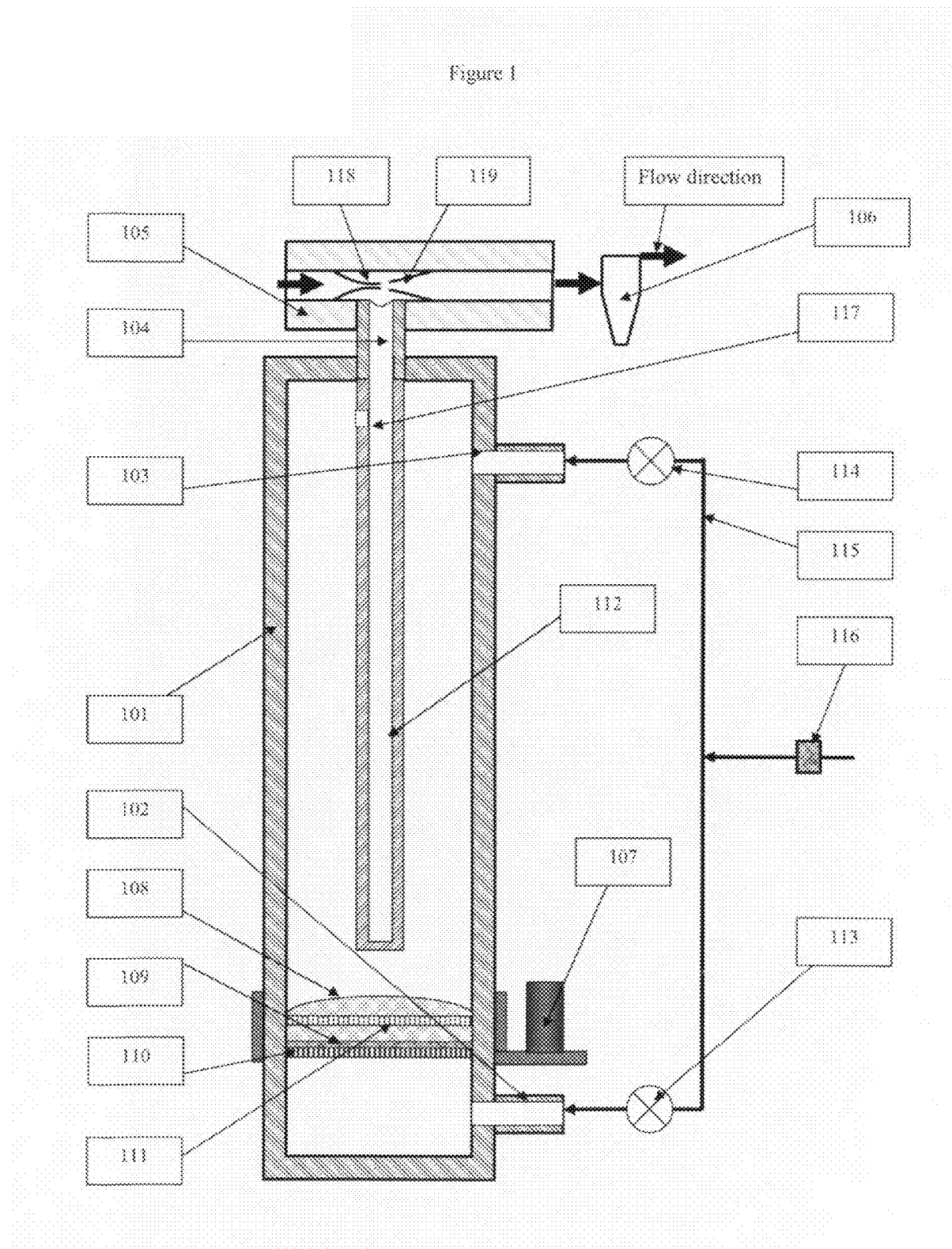
FIG. 1 is a perspective view of the nanoparticle aerosol generator.

A first embodiment, as shown in FIG. 1, is a nanoparticle aerosol generator consists of a vibrating fluidized bed with a baffle, a vibrating Venturi disperser and a cyclone separator. The vibrating fluidized bed with a baffle is comprised of a cylinder 101 with a proximal and distal ends that can have at least two air feed ports, one port on the proximal end 102 and the other on the distal end 103, and an exit port 104 on the cylinder top which can be connected to a vibrating Venturi disperser 105 which can be connected to a cyclone separator 106. A vibrator 107 attached to the cylinder can produce mechanical vibrations. Sample/nanoparticle dry powder 108 to be aerosolized can rest on a filter 109 supported by a stainless steel air distributor 110 on the proximal end in the cylinder. A stainless steel screen 111 can be placed in the sample/dry powder to break up larger agglomerates. A further embodiment of the nanoparticle aerosol generator can include a baffle 112 which is connected around the exit port. The vibrating cylinder further can be used as a vibrating fluidized bed with a baffle.

Another embodiment of the nanoparticle aerosol generator can include a cylinder 101 made of metal or other materials. A vibrator is attached to the cylinder. The cylinder can have a proximal and a distal end. Both ends can have air feed ports 102, 103. These air feed ports can have their control valves and flow meters 113, 114, and air feed tubes 115 attached in which clean and dry air can be pulled into the cylinder through an activated carbon and HEPA filter 116. The cylinder can also have an exit port 104 on the top. A stainless steel air distributor 110 can be placed above the air feed port 102 on the proximal end in the cylinder. A filter 109 can sit on the stainless steel air distributor 110. Sample/nanoparticle dry powder 108 to be aerosolized can be rest on the filter 109. A stainless steel screen 111 with a diameter just smaller than the inner diameter of the cylinder can be placed in the sample/ nanoparticle dry powder. The stainless steel screen 111 can break up larger agglomerates through the impaction between sample and the stainless steel screen. Without the stainless steel screen the output aerosol concentration can be much lower. The vibrating cylinder can induce pressure wave/fluctuation in the air which carries the particles, especially in the air nearby the inner surface of the cylinder. The air pressure wave/fluctuation can help break up the larger agglomerates. Mechanical vibrations can be produced by a vibrator attached to the proximal end of the cylinder. The vibration can be agitated by any known agitation mechanism known to one skilled in the art. Mechanical vibration can be applied parallel with the axis of the cylinder.

The baffle 112 can be a stainless steel tubing or other material tubing with one dead-end and one open-end. The open-end can be of an effective diameter to be attached in the center of the vibrating cylinder around its exit port 104. A hole 117 near the open-end of the baffle can be used as the aerosol exit in the baffle. The dead-end of the tubing 112 can extend to just above the top of the sample/dry powder 108. The baffle vibrating with the cylinder can transfer the mechanical vibrating energy to the center region of the air that carries the particles in the cylinder. The air flow pressure wave/fluctuations induced by the vibration can help destroy cohesions between particles. When the aerosol flows upward, some of the larger agglomerates can be removed from aerosol streams by the baffle 112. Without the baffle, the size of the output particles is much larger.

The mechanical vibration not only generates pressure wave/fluctuations in the air flow to destroy cohesions between particles, but also reduces deposition of the particles on the inner surface of the cylinder and the outer surface of baffle. In the embodied nanoparticle aerosol generator, the extra mechanical vibration energy is transferred to the air flow that carries the particles, and eventually, the energy is used to help destroy cohesions between particles efficiently.

The Venturi disperser 105 can be connected to the exit port 104 of the vibrating cylinder. The Venturi disperser vibrates with the vibrating cylinder. The Venturi disperser has a constriction 118 in a pipe. A high-velocity air jet blowing across the constriction 118 in the Venturi disperser, can create a vacuum in the cylinder 101 and clean and dry air can be drawn into the cylinder from the air feed ports on the both proximal and distal ends through an activated carbon and HEPA filter 116. A portion of the air drawn in from the proximal end air feed port 102 will flow through the dry powder layer 108 in the cylinder to carry some small particles upward to form an aerosol stream, and will move towards the exit port 104, while the rest of air enters the cylinder through the air feed port 103 on distal end and mixes with the upward flowing aerosol stream. The air flow from the distal end air feed port will hit the crossflow aerosol stream resulting in some larger particles being removed from the aerosol stream. The aerosol can also be diluted by the clean and dry air, which helps reduce the probability of re-agglomeration of the particles. When the aerosol stream flows nearby the hole 117 in the baffle 112, some larger particles will be removed because they not able to follow the air to make a 90° turn to enter the hole 117. Smaller particles can follow the air flow to leave the cylinder. Once the aerosol enters the Venturi disperser, particles will impact on a tube 119 in the Venturi disperser first. The large particles will be dispersed by this impaction, while smaller particles will follow the air flow to mix with vibrating high speed shear flow in the Venturi disperser. The vibrating high speed shear flow will continuously disperse the agglomerates, dilute the aerosol, and deliver the aerosol to the cyclone separator 106. In the cyclone separator the larger particle can be separated. After passing the cyclone separator 106, the aerosol mixes with clean and dry air in a mixing device (which is not shown in FIG. 1) to achieve desired concentrations. The aerosol can be diluted in the mixing device. The dilution can reduce the probability of the particle re-agglomeration before the aerosol enters the inhalation exposure chamber. The use of the Venturi disperser allows for the pressure in the cylinder to be slightly negative. Negative pressure in the cylinder can prevent the particles or other toxin material from escaping from the cylinder. Unlike most of the conventional Venturi dispersers use high speed shear flow to break up large agglomerates, this embodiment uses a vibrating high speed shear flow and multiple impaction to disperse larger agglomerates. The particle size and mass concentration can be controlled via adjusting: (1) flowrate of air passing through the dry powder layer with valve 113; and (2) the vibration frequency and amplitude. The higher air flowrate through the dry powder layer, the higher aerosol concentration. For example, the nano-sized $TiO_2$ aerosol mass concentration can be increased to 12 $mg/m^3$ from 6.2 $mg/m^3$ in the inhalation exposure chamber when the air flowrate through the dry powder is increased to 3 LPM from 1.5 LPM.

Characterization of Aerosols Generated by Nanoparticle Aerosol Generator.

In order to test the dust/aerosol generators, nano-sized $TiO_2$ dry powder (Aeroxide P25, Evonik, Germany) with primary diameter of 21 nm and density of 3.7 $g/cm^3$ and nano-sized $CeO_2$ dry powder with primary diameter of 3 nm and density of 7.1 $g/cm^3$ were used. Three dust/aerosol generators were tested for the ability to generate nanoparticle aerosols having: (1) a consistent concentration maintained at a desired level for hours, (2) a homogenous composition free contaminants, and (3) a size distribution with a geometric mean diameter<200 nm and geometric standard deviation $\sigma_g$<2.5. Before being aerosolized, $TiO_2$ or $CeO_2$ dry powders were conditioned in a dry desiccator for 24 hours. The aerosols were delivered to a 0.5 $m^3$ stainless steel inhalation exposure chamber for the measurements.

Measurement Methods:

An electric low pressure impactor (ELPI) (Dekati Inc., Finland), a scanning mobility particle sizer (SMPS) (TSI Inc., Shoreview, Minn., USA) were used to measure real time particle size distributions and relative mass concentration of the particles in the inhalation exposure chamber. A TSE dust concentration monitor (TSE Systems GmbH, German) was used to monitor relative concentration of the aerosols generated by TSE dust generators (TSE Systems GmbH, German). The real mass concentrations of the aerosols were determined gravimetrically.

Figure 2:
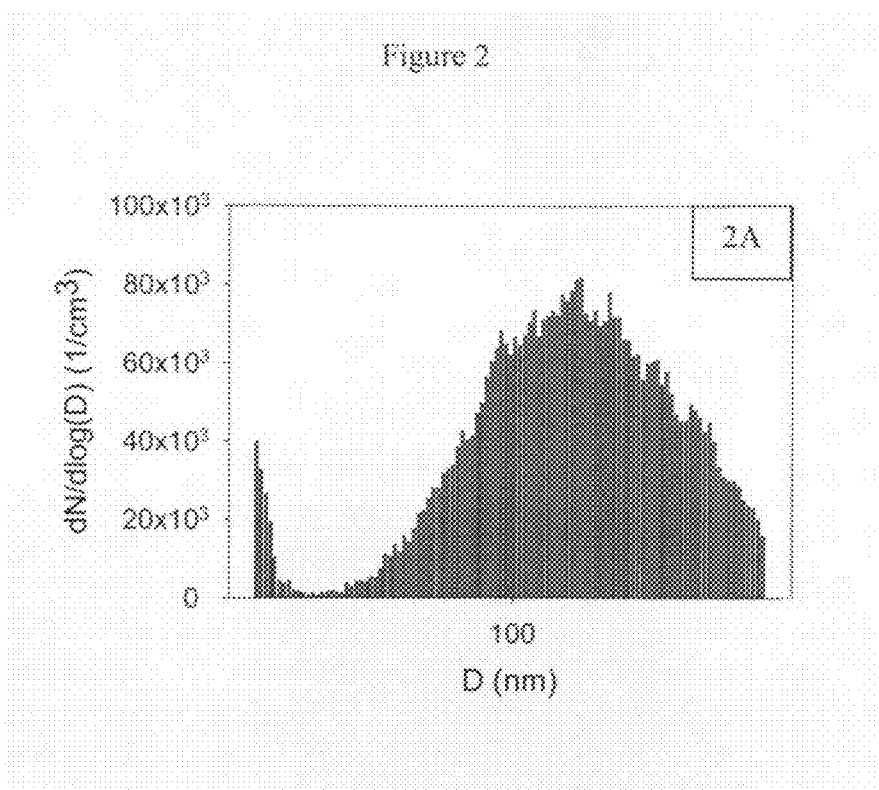
FIG. 2 is SMPS measurements of $TiO_2$ aerosol generated by the embodied nanoparticle aerosol generator particle size distribution where N=the number of particles, D=geometric diameter.
Figure 3:
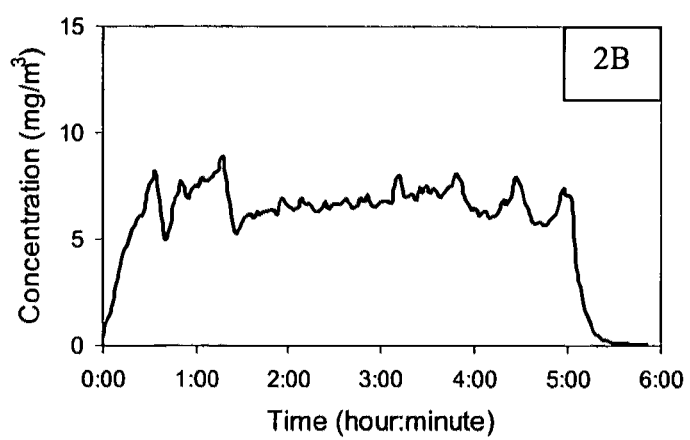
FIG. 3 is SMPS measurements of TiO2 aerosol generated by the embodied nanoparticle aerosol generator mass concentration vs. time where N=the number of particles, D=geometric diameter.
Figure 4:
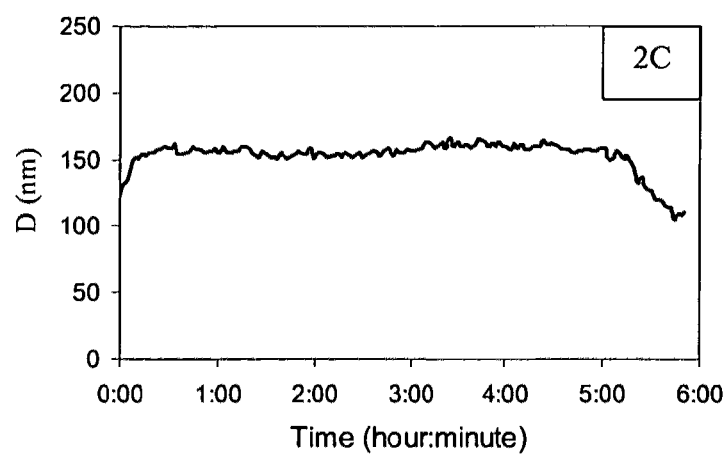
FIG. 4 is SMPS measurements of TiO2 aerosol generated by the embodied nanoparticle aerosol generator particle size vs. time where N=the number of particles, D=geometric diameter.
Figure 5:
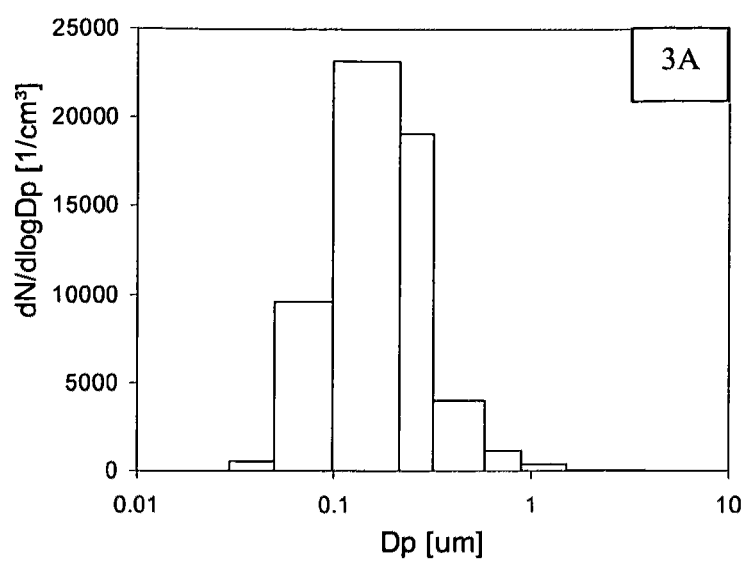
FIG. 5 is ELPI measurements of $TiO_2$ aerosol generated by the embodied nanoparticle aerosol generator particle size where N=the number of particles, Dp=aerodynamic diameter.
Figure 6:
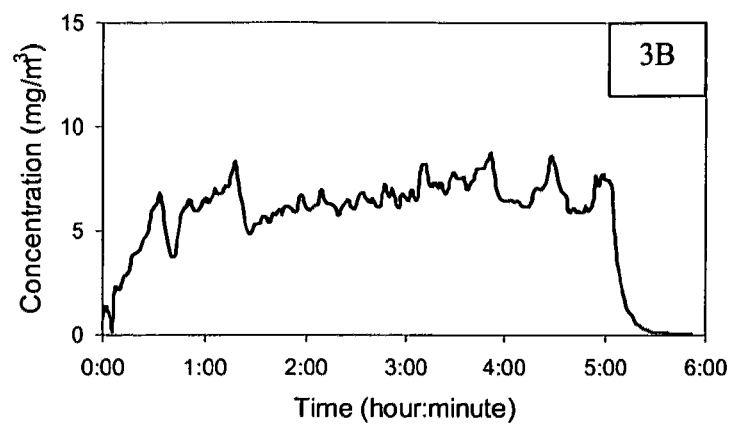
FIG. 6 is ELPI measurements of TiO2 aerosol generated by the embodied nanoparticle aerosol generator mass concentration vs. time where N=the number of particles, Dp=aerodynamic diameter.
Figure 7:
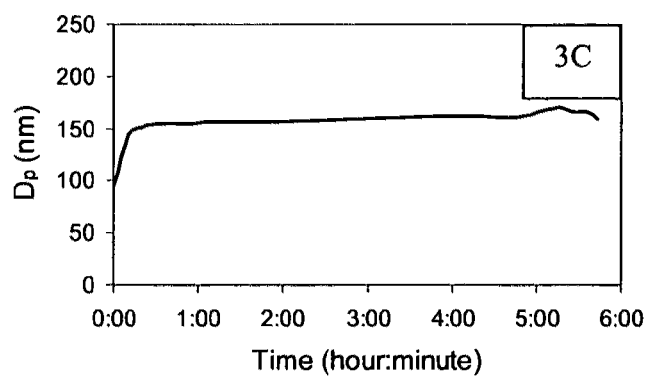
FIG. 7 is ELPI measurements of TiO2 aerosol generated by the embodied nanoparticle aerosol generator particle size vs. time where N=the number of particles, Dp=aerodynamic diameter.
Figure 8:
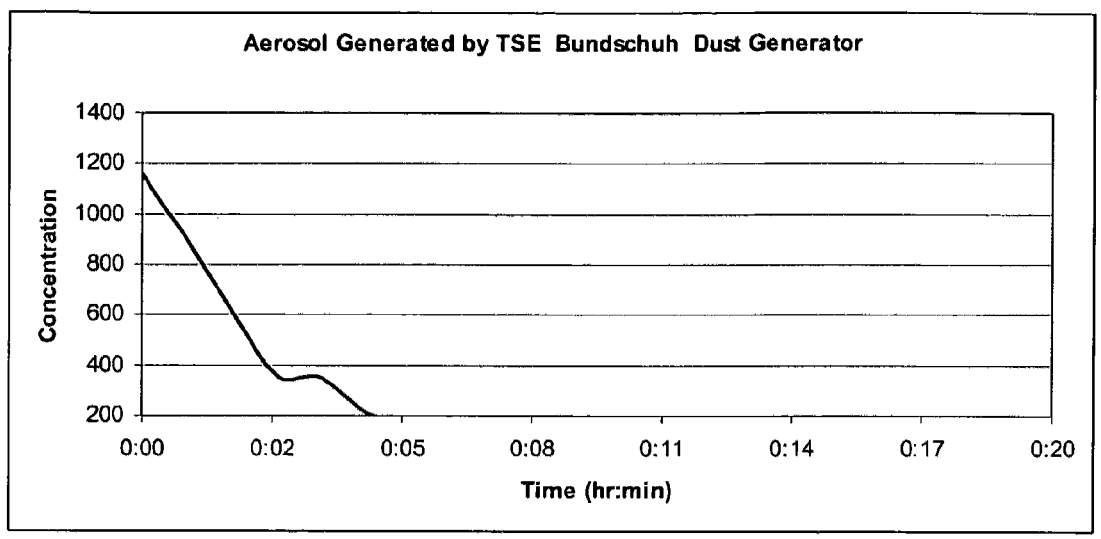
FIG. 8 is a graph of the relative concentration of $TiO_2$ aerosol generated by a TSE Bundschuh dust generator, measured with TSE dust concentration monitor.
Figure 9:
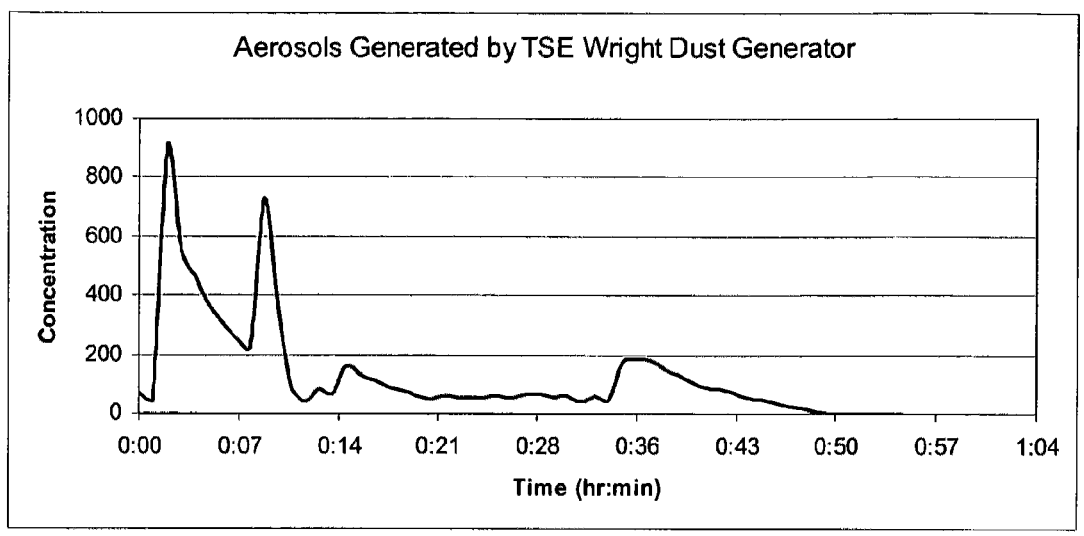
FIG. 9 is a graph of the relative concentration of $TiO_2$ aerosol generated by a TSE Wright dust generator measured with TSE dust concentration monitor.

Experimental Results:

TiO$_2$ Aerosols:

Two embodied nanoparticle aerosol generators were operated simultaneously to deliver TiO$_2$ aerosols to a 0.5 m$^3$ inhalation exposure chamber at flowrate of 90 LPM. The air flow rate through the dry powder layer in each nanoparticle aerosol generator was 1.5 LPM. A pneumatic vibrator driven by 60 psi compressed air was used to produce mechanical vibration. FIGS. 2A-2C are the particle size distribution, particle mass concentration and particle mean geometric diameter evolution measured with the SMPS. As can be seen from FIGS. 2A-2C, when the particle concentration reaches the desired concentration in the inhalation exposure chamber, the aerosol generated by the nanoparticle aerosol generators has: (1) a geometric mean diameter=157 nm with a standard deviation $\sigma_g$=2.3 (FIG. 2); (2) a relatively stable particle mass concentration of 6.2 mg/m$^3$ during a 5-hour-study (FIG. 3); (3) a stable particle size with a relative deviation less than 7% during 5-hour-study (FIG. 4). FIGS. 5-7 are the aerodynamic diameter distribution, relative mass concentration, and particle size evolution measured with the ELPI. The count-median aerodynamic diameter of the particles is 152 nm. The relative mass concentration of the particles is stable during a 5-hour-study. FIGS. 8 and 9 are the particle concentrations of TiO$_2$ aerosols generated by TSE Bundschuh dust generator and TSE Wright dust generator. The particle concentration of the aerosols generated by TSE dust generators could not be maintained at a constant level. The outcome of the studies is summarized in Table 1.

TABLE 1

| | Dust Generator | Test location | Outcome |
|---|---|---|---|
| 1 | TSE Bundschuh dust generator | Our lab | A nozzle Venturi disperser was blocked by the nano TiO$_2$ particles after several minutes. |
| 2 | TSE Wright dust generator | Our lab | No stable generation and output hole of the particles was blocked nano by TiO$_2$ particles after 30-40 minutes. |
| 3 | Nanoparticle aerosol generator | Our lab | Nanoparticle aerosol concentration remained stable for hours |

Figure 10:
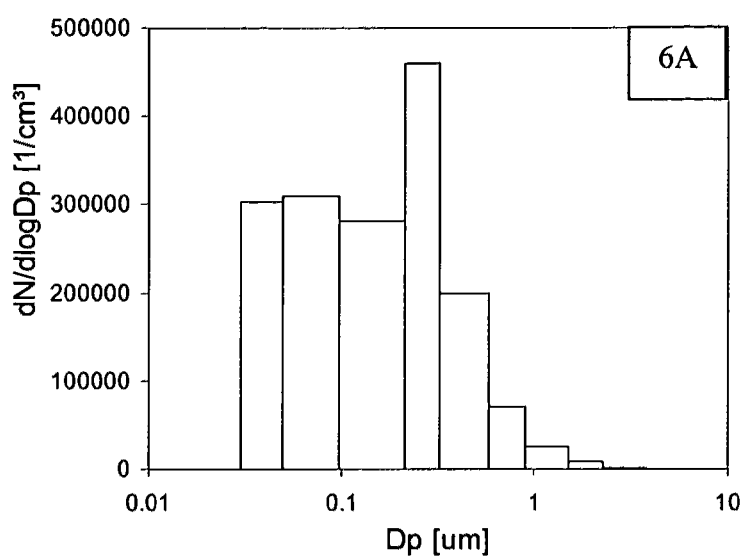
FIG. 10 is ELPI measurements of $CeO_2$ aerosol generated by the embodied nanoparticle aerosol generator particle size distribution where N=the number of particles, Dp=aerodynamic diameter.
Figure 11:
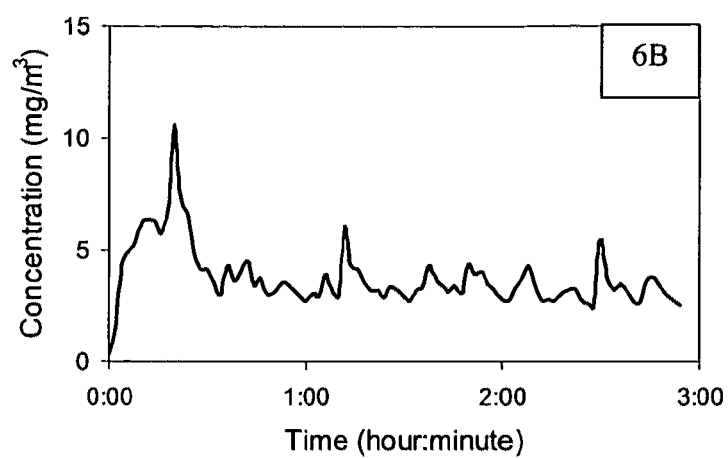
FIG. 11 is ELPI measurements of CeO2 aerosol generated by the embodied nanoparticle aerosol generator mass concentration vs. time where N=the number of particles, Dp=aerodynamic diameter.
Figure 12:
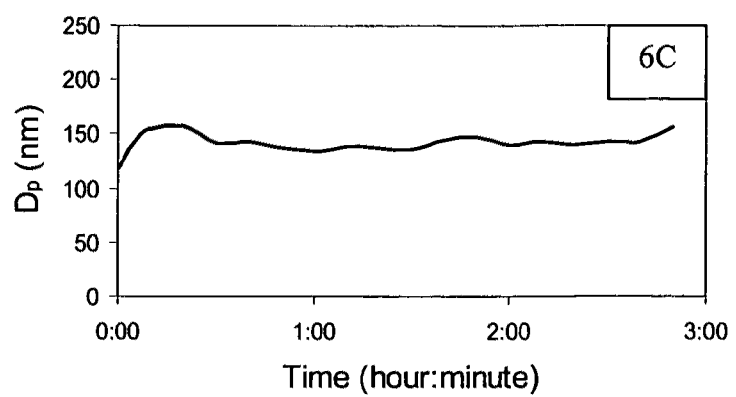
FIG. 12 is ELPI measurements of CeO2 aerosol generated by the embodied nanoparticle aerosol generator particle size vs. time where N=the number of particles, Dp=aerodynamic diameter.

CO$_2$ Aerosols:

One embodied nanoparticle aerosol generator was operated to generate CeO$_2$ aerosols from nano-sized CeO$_2$ dry powder. The air flow rate through the CeO$_2$ dry powder layer in the nanoparticle aerosol generator was 1.5 LPM. The aerosol was delivered to a 0.5 m$^3$ inhalation exposure chamber at flowrate of 90 LPM and measured with the ELPI. FIGS. 10-12 are the particle size distribution, particle relative mass concentration and particle count median aerodynamic diameter evolution measured with the ELPI. As can be seen from FIGS. 10-12, when the particle concentration reaches the desired concentration in the inhalation exposure chamber, the CeO$_2$ aerosol generated by the nanoparticle aerosol generators has: (1) a count median aerodynamic diameter=145.4 nm (FIG. 10); (2) a relatively stable particle mass concentration during a 3-hour-study (FIG. 11); (3) a relative stable particle size during a 3-hour-study (FIG. 12).

Among the tested aerosol/dust generators, the embodied nano-particle aerosol generator is the only one that can generate nanoparticle aerosols from nano-TiO$_2$ or CeO$_2$ dry powder directly.

These terms and specifications, including the examples, serve to describe the invention by example and not to limit the invention. It is expected that others will perceive differences, which, while differing from the forgoing, do not depart from the scope of the invention herein described and claimed. In particular, any of the function elements described herein may be replaced by any other known element having an equivalent function.

REFERENCES

1. Schmoll L H, Elzey S., Grassian V H, O'shaughnessy P T., 2009, Nanoparticle aerosol generation methods from bulk powders for inhalation exposure studies. Nanotoxicology, 3(4): 265-275
2. To D, Dave R, Yin X, Sundaresan S, 2009, Deagglomeration of Nanoparticle Aggregates via Rapid Expansion of Supercritical or High-Pressure Suspensions, AIChE Journal, Vol. 55, No. 11, 2087-2026
3. Willeke K, editor. 1980. Generation of aerosols and facilities for exposure experiments. Ann Arbor Science Publishers.

What is claimed:

1. A nanoparticle aerosol generator capable of dispersing agglomerates of particles comprising:
   a vibrating fluidized bed including a baffle and a cylinder, wherein the cylinder includes:
      a proximal end and a distal end, each end containing one or more air feed ports connected to air feed tubes in which clean air can be pulled into the cylinder;
      an exit port at the distal end above the distal air feed port and connected to a Venturi disperser that is connected to a cyclone separator;
      a vibrator attached at the proximal end;
      a filter supported by an air distributor attached at the proximal end above the proximal air feed port;
   the baffle attached at the distal end having a hole near the exit port;
   wherein the Venturi disperser can create a negative pressure in the cylinder.

2. The nanoparticle aerosol generator of claim 1 further comprising a stainless steel screen.

3. The nanoparticle aerosol generator of claim 1 wherein the air feed ports comprise control valves and flow meters.

4. The nanoparticle aerosol generator of claim 3 wherein the control valves can control particle size and mass concentration of a sample by adjusting airflow rates through the sample.

5. The nanoparticle aerosol generator of claim 1 wherein the air feed tubes attach to a filter disposed outside of the cylinder.

6. The nanoparticle aerosol generator of claim 5 wherein the filter disposed outside of the cylinder is an activated carbon and HEPA filter.

7. The nanoparticle aerosol generator of claim 1 wherein the baffle extends into an area just above a sample.

8. The nanoparticle aerosol generator of claim 1 wherein the cyclone separator is attached to a mixing device.

9. The nanoparticle aerosol generator of claim 1 wherein particle size and mass concentration of a sample can be controlled by adjusting vibration frequency and amplitude of the vibrator.

10. A device comprising the nanoparticle aerosol generator of claim 1.

11. The nanoparticle aerosol generator of claim 1 wherein the Venturi disperser is a vibrating Venturi disperser.

12. The nanoparticle aerosol generator of claim 1 further comprising a sample that is placed on the filter.

13. The nanoparticle aerosol generator of claim 12 wherein sample comprises nanoparticles of dry powder.

14. The nanoparticle aerosol generator of claim 8 wherein the mixing device mixes the aerosol with air to a desired concentration.

15. The nanoparticle aerosol generator of claim 1 wherein the air distributor is a stainless steel air distributor.

16. The nanoparticle aerosol generator of claim 1 wherein the generator operates at less than atmospheric pressure.

* * * * *